Feb. 22, 1927. 1,618,935

J. KUSHNIER

VEGETABLE CUTTER

Filed Aug. 27, 1926  2 Sheets-Sheet 1

John Kushnier
INVENTOR

BY Victor J. Evans
ATTORNEY

WITNESS:

Feb. 22, 1927. 1,618,935
J. KUSHNIER
VEGETABLE CUTTER
Filed Aug. 27, 1926    2 Sheets-Sheet 2

John Kushnier
INVENTOR
BY Victor J. Evans
ATTORNEY

WITNESS:

Patented Feb. 22, 1927.

1,618,935

UNITED STATES PATENT OFFICE.

JOHN KUSHNIER, OF POWHATAN POINT, OHIO.

VEGETABLE CUTTER.

Application filed August 27, 1926. Serial No. 131,987.

This invention relates to a vegetable cutter, the general object of the invention being to provide a cylinder having cutting means thereon and which is located in a hopper, with means for rotating the cylinder so that it will cut slices or pieces from vegetables placed in the hopper, said slices or pieces passing into the cylinder and dropping from the discharge end thereof.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
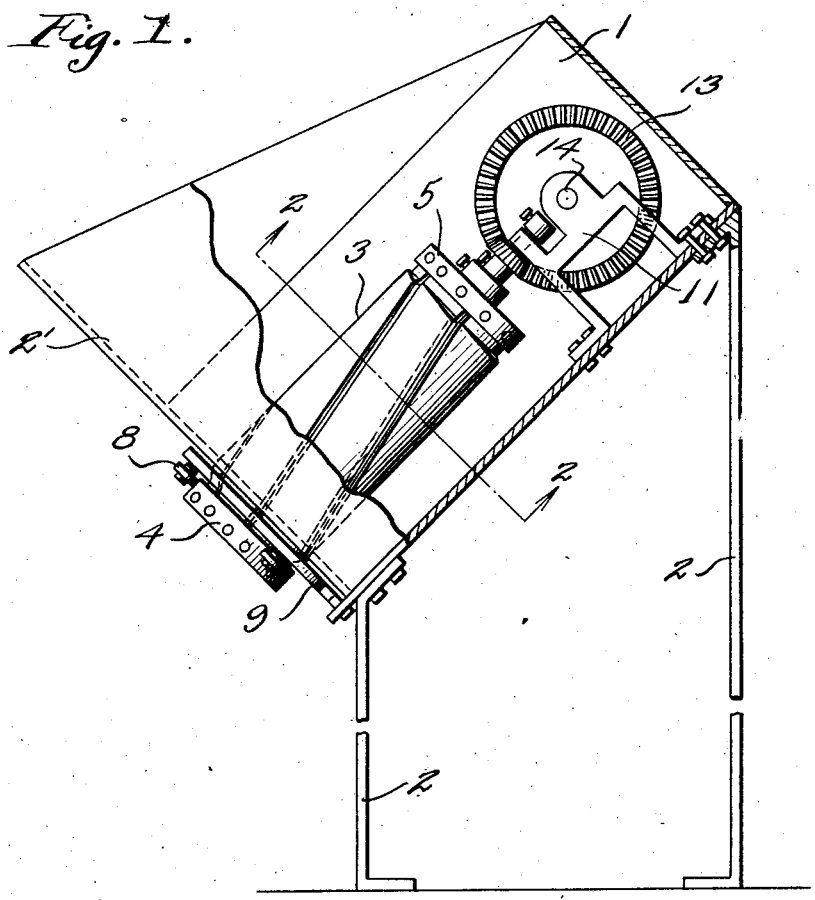
Figure 1 is an elevation of the device, with parts in section.
Figure 2:
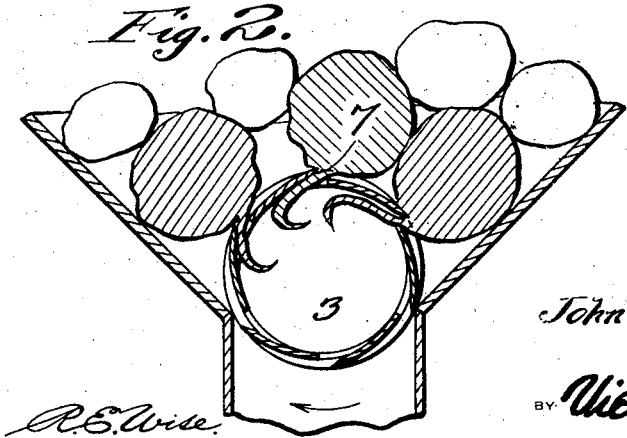
Figure 2 is a section on line 2—2 of Figure 1.
Figure 3:
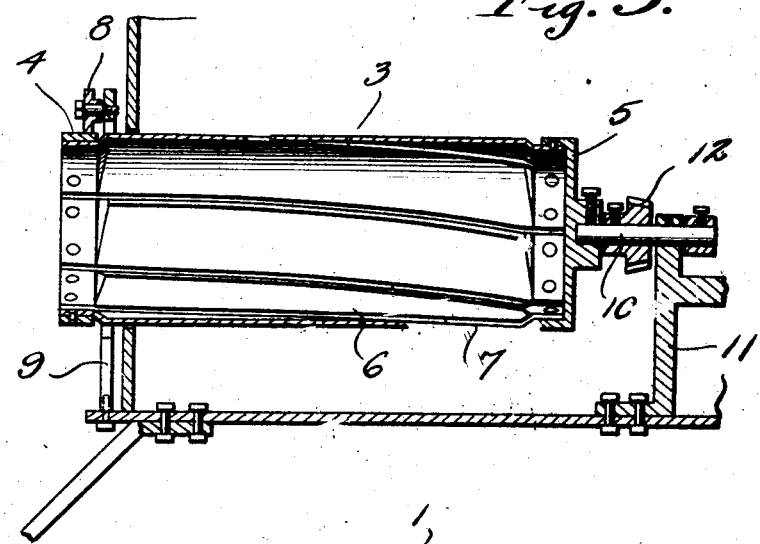
Figure 3 is a section on line 3—3 of Figure 4.
Figure 4:
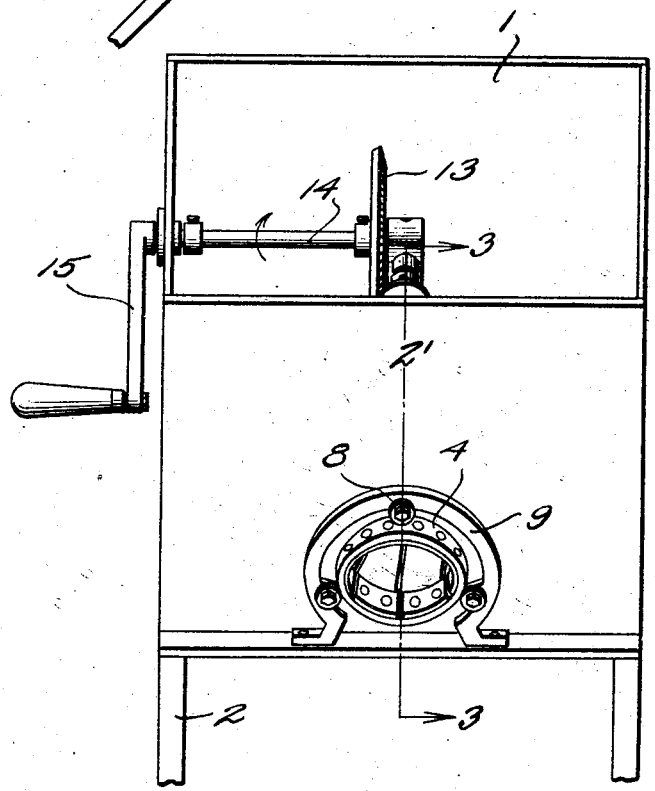
Figure 4 is a front view of the invention.

In these views, 1 indicates a casing which is supported by the legs 2 in a position which is inclined to the horizontal so that vegetables or other articles placed in the casing will pass to the lower corner of the casing, the upper part of the lower end of the casing being extended, as at 2, to form a hopper. The side walls of the casing may be flared, as shown in Figure 2, so that the hopper will contain a large quantity of vegetables. A cylinder 3 is rotatably mounted in the casing and has one end extending through an opening formed in the lower end of the casing. The cylinder is formed of the end ring 4, the end cap 5 and the blades 6 which have their ends connected with the ring 4 and the cap 5. These blades have their forward edges beveled, as shown at 7, to form cutting edges, the cutting edge of one blade being bent outwardly so that it will project above the rear edge of the blade in advance of it. Thus the slices cut from the vegetables by the blades will pass through the space between the cutting edge of one blade and the rear edge of the next blade and drop into the cylinder, and as the cylinder is inclinedly arranged, the slices will pass through the cylinder and drop from the lower end of the same.

The ring 4 is engaged by the rollers 8, the spindles of which are carried by the member 9 which is supported by the projecting lower end of the bottom of the casing. A shaft 10 is fastened to the cap 5 and the said shaft is journaled in a support 11 which is located within the upper end of the casing. Thus the cylinder is rotatably supported by the rollers 8 carried by the member 9 and the shaft 10 and support 11. A beveled gear 12 is fastened to the shaft 10 and meshes with a gear 13 which is fastened to a cross shaft 14 having one end journaled in the support 11 and its other end journaled in one side of the casing. A crank handle 15 is fastened to the projecting end of this shaft 14.

Thus by turning the crank handle, the cylinder will be rotated so that its knives or cutters will cut slices or pieces from articles placed in the casing and said slices or pieces will drop into the cylinder and pass through the lower end of the same.

This device can be used for cutting cabbage to make slaw and for slicing other vegetables and fruits.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A cutter of the class described comprising a casing, means for supporting the same at an angle to the horizontal, a cylinder in the casing having one end passing through the lower end of the casing, a support at the lower end of the casing, rollers carried thereby and engaging the lower end of the cylinder for supporting the same, a shaft connected with the upper end of the cylinder, a support in the casing having a journal thereon for the shaft, a shaft journaled in the support and passing through one side of the casing, a crank handle on the projecting end of the said shaft, gears on the two shafts meshing with each other and cutters forming portions of the cylinder and arranged to cut slices or pieces from articles placed in the casing and causing the slices or pieces to pass into the cylinder and drop from the lower end thereof.

In testimony whereof I affix my signature.

JOHN KUSHNIER